Dec. 16, 1958  S. T. DUEKER  2,864,461
INTEGRATED OIL SEPARATING SYSTEM FOR GAS COMPRESSORS
Filed March 23, 1955  2 Sheets-Sheet 1

INVENTOR:
STANLEY T. DUEKER
By Gravely, Lieder, Woodruff and Wills
ATTORNEYS.

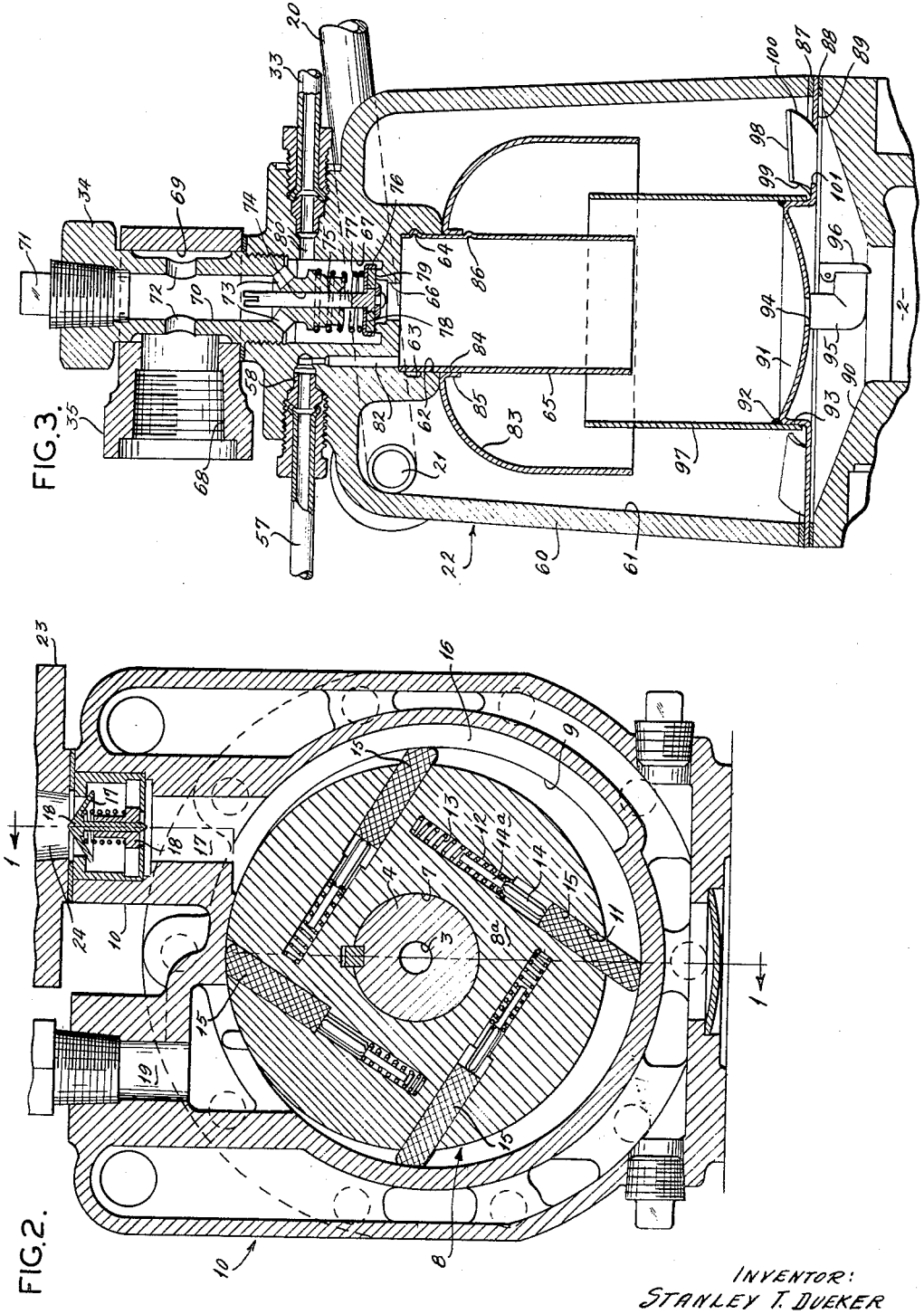

2,864,461

INTEGRATED OIL SEPARATING SYSTEM FOR GAS COMPRESSORS

Stanley T. Dueker, Affton, Mo., assignor to Wagner Electric Corporation, St. Louis, Mo., a corporation of Delaware Application March 23, 1955, Serial No. 496,189

10 Claims. (Cl. 183—41)

This invention relates to oil separators in general and particularly to oil separators used with compressors. More particularly, the present invention relates to an oil separator for separating oil from a compressed air and oil mixture of the type usually encountered in the output of a compressor.

Prior oil separators have been devised using a swirling movement of the compressed mixture in combination with a tortuous path through baffles to separate a liquid or a solid from a gas. These devices use the centrifugal force created by the swirling action to throw the heavier particles carried by the mixture against a casing or frame. This compressed gas is then directed along a tortuous path between baffles to further loose the heavier materials. Many different arrangements of baffling have been devised for this purpose, but none of them solves the problem which is created by the inherent foaming of the oil. This problem usually arises during the time the compressor is idling. The oil carried into the separator during compression contains compressed pockets of air even after the oil has settled in the oil reservoir. During non-compression the pressure in the oil separator is exhausted to the atmosphere. This reduction in pressure causes the small pockets of air in the oil to expand in volume many times. This expansion acts on the oil and causes the oil to foam. When the compressor again starts, part of the foam oil is usually discharged with the compressed air if some means are not employed to prevent this. The present oil separator is designed to solve this problem.

One of the principal objects of the present invention is to provide a substantially oil free compressed air source.

Another object of the present invention is to provide an oil separator which has a large capacity for desirably handling a foam of oil which may accumulate therein without increasing the size of the separator.

Another object of the present invention is to provide an oil separator which discharges oil free air and which will not discharge foam oil which accumulates therein.

A further object of the present invention is to provide an oil separator which may be used in conjunction with an air compressor and which will further purify the discharged air by eliminating contact between the discharged air and the oil foam which develops when the compressor is idling and the separator pressure is reduced.

Other objects and advantages of the present invention will become apparent in the following description of the preferred embodiment which is illustrated by the accompanying drawings. In the drawings:

Fig. 2 is a vertical cross-sectional view taken along the line 2—2 of Fig. 1; and Fig. 3 is an enlarged cross-sectional view of an oil separator embodying the present invention.

Figure 1:
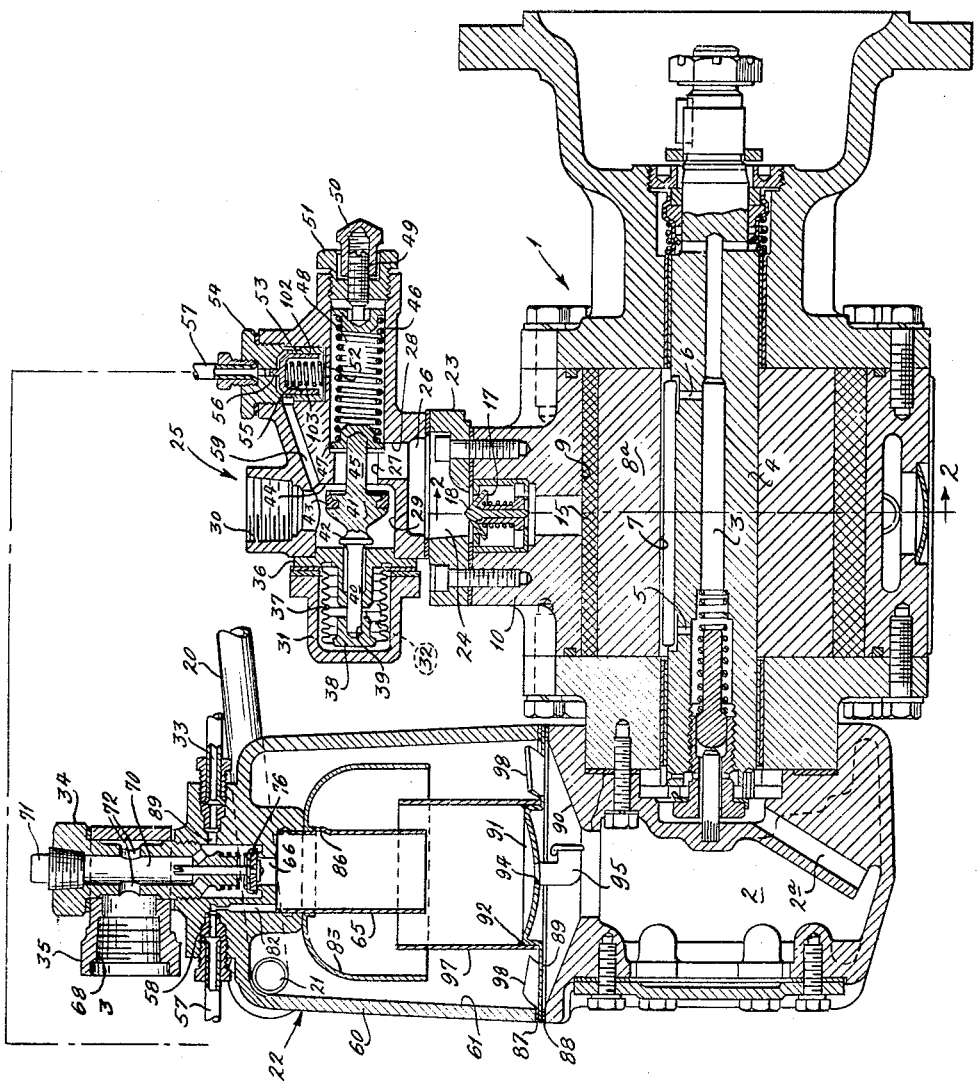
Fig. 1 is a vertical cross-sectional view of the present invention showing the oil separator being used in conjunction with a compressor and an air control valve.

Referring to the accompanying drawings in detail, the number 1 refers to a compressor which receives air or gas at atmospheric pressure and exhausts the same mixed with oil at a higher pressure. To accomplish the compression process efficiently, it is desirable that the movable parts which confine the air or gas during compression be sealed with some mobile liquid. An oil is normally used for this purpose.

To the left of the compressor 1, in Fig. 1, is an oil sump 2 which is placed in communication with the air confining components of the compressor 1 by a connecting passageway 2a. The passageway 2a connects the oil sump 2 with a counterbore 3 in a shaft 4 which is rotatably mounted in the compressor 1. The shaft 4 is sealed from the frame of the compressor 1 to prevent the undesirable escape of compressed gas past the shaft 4. Transverse crossbores 5 and 6 in the shaft 4 connect the longitudinal crossbore 3 in said shaft 4 with a chamber 7 formed between the outer surface of the shaft 4 and a cylindrical rotor 8a, and extending axially in the cylindrical rotor member 8a. The rotor member 8a is fixedly connected to the shaft 4 by a slidable key which is shown in Fig. 2 positioned in cooperating slots in the shaft 4 and in the rotor member 8a.

Again referring to Fig. 2, the shaft 4, with the rotor member 8a carried concentrically thereon, is positioned in a cylindrical bore 9 in a stator 10. The shaft 4 and the rotor member 8a are positioned so that their axes will be parallel to but will not coincide with the axis of the cylindrical bore 9. The reason for this will become apparent hereinafter when the operation of the compressor is considered.

The cylindrical rotor member 8a has overcenter slots 11 which extend axially the length of said member 8a. Extending inwardly from each of the overcenter slots 11 are a plurality of counterbores 12 which receive compression loaded springs 13 that are positioned between the seat of the counterbores 12 and cooperating plungers 14. Each of the plungers 14 is slidably received in one of the counterbores 12 and has a narrow shaft 14a extending inwardly along the inner edge of the compression loaded springs 13.

Slidably received in each of the overcenter slots 11 in the cylindrical rotor member 8a are vanes 15 which extend axially the length of the cylindrical rotor member 8a and are positioned between the wall of the cylindrical bore 9 and the plungers 14 that slide in the counterbores 11. The vanes 15 are constructed so that for every position of the cylindrical rotor member 8a relative to the cylindrical bore 9, the vanes 15 will be urged into engagement with the surface of said cylindrical bore 9 by the compression loaded springs 13. Fig. 2 shows positions for four such vanes 15. The cylindrical rotor member 8a in combination with the vanes 15 and their associated plungers 14 constitute the rotor 8.

The rotor 8 is driven clockwise, Fig. 2, by an external drive means (not shown), and the vanes 15 move in and out in their respective overcenter slots 11. When one of the vanes 15 is engaged with the uppermost surface of the cylindrical bore 9 it will be in its innermost position in its slot 11. Conversely, when one of the vanes 15 is engaging the bottommost surface of the cylindrical bore 9 it will be in its outermost position relative to its slot 11. Between these extremes the vanes 15 will occupy intermediate positions in their slots 11.

Associated with the right side of the cylindrical bore 9 (Fig. 2) is an inlet groove 16. The inlet groove 16 connects an intake passage 17 with the air space between the vanes 15 on the right side of the rotor 8. A unidirectional check valve 18 is provided in the intake passage 17 and will admit air from an outside source into the intake passage 17, but will not permit air to leave the intake passage 17 thereby.

To the upper left of the rotor 8 is a discharge passage 19 which is connected by a hollow tube 20 to an inlet port 21 in an oil separator 22 which is the subject matter of the present invention. The hollow tube 20 directs the compressed air from the compressor 1 into the oil separator 22.

An adaptor plate 23 is connected to the upper portion of the stator 10 and is provided with an air chamber 24 that is aligned with the upper end of the air intake passage 17 on the stator 10.

A control valve assembly 25, the function of which will be later described, is connected to the adaptor plate 23. An air chamber 26 in the base of the control valve assembly 25 is aligned with the air chamber 24 in the adaptor plate 23 when the valve 25 is in position. The air chamber 26 is also connected to a horizontal crossbore 27 in the control valve assembly 25 by a passage 28. During normal operation, when air is being compressed, the horizontal crossbore 27 has free passage to a larger diameter counterbore 29 in the control valve assembly 25 which is connected by a vertical passage 30 to the atmosphere at all times.

The control valve assembly 25, Fig. 1, is connected to a bellows housing 31. The bellows housing 31 is provided with an inlet port 32 which receives an air line 33 that connects the inside of the bellows housing 31, through a check valve guide 34 and a discharge fitting 35 to a compressed air reservoir (not shown). Interposed between the left end of the control valve assembly 25 and the bellows housing 31 is a piston stop plate 36 and a bellows 37 which are supported in position between the bellows housing 31 and the control valve assembly 25. The bellows 37 and the bellows housing 31 are positioned so that they will be axially aligned with the counterbore 29 in the control valve assembly 25. The left end of the bellows 37 is provided with a bellows retainer block 38 which is formed integrally with the bellows 37 and seals the end of the bellows 37. The bellows retainer block 38 also has a counterbore 39 for receiving the left end 40 of an air control piston 41. The air control piston 41 extends through an opening in the center of the piston stop plate 36 and has an annular stop ring 42 that limits leftward movement of said piston 41 which occurs when the annular ring 42 strikes the piston stop plate 36. The air control piston 41 is provided with a sealing cup 43 which cooperates with a seat 44, formed at the junction of the crossbore 27 and the counterbore 29, when the piston 41 is in its rightward position. When so engaged the sealing cup 43 and its cooperating seat 44 cut off the air that normally is fed into the compressor intake passage 17.

A rightward extending projection 45 of the air control piston 41 extends into another crossbore 46 in the air control valve assembly 25 where it engages the left end retainer cup 47 of a compression spring 48. The compression spring 48 normally biases the air control piston 41 to the left so that the sealing cup 43 is not engaged with its cooperating seat 44. The right end of the compression spring 48 engages an adjusting means 49 which is received through the right end of the crossbore 46 and affords a method for varying the pressure necessary to shut off the air being supplied to the compressor 1. The adjusting means, shown in Fig. 1, consists of an adjustable screw 49 and a lock nut 50. The adjustable screw 49 passes through a threaded housing 51 which is positioned in the right end of the crossbore 46.

A passage 52 intersects the crossbore 46 and terminates in a counterbore 53 which extends through the top of the control valve assembly 25. The counterbore 53 threadedly receives an unloader valve housing 54 having a counterbore 55 and an upwardly extending air passage 56 that connect with airline 57. An unloader valve 102 normally biased closed by a spring 103 is located in the counterbore 55. The air line 57 connects the air passage 56 in the unloader valve housing 54 with a counterbore 58 in the oil separator 22 to be described later. The vertical passage 30 and the vertical counterbore 53 are connected by a passage 59.

To the left of the control valve assembly 25 and the compressor 1 is the oil separator 22 which has a housing 60, Fig. 3, with a round tapered inner wall 61 that forms a bell-shaped chamber. The inlet port 21 through which the mixture of compressed air and oil from the compressor 1 enters the oil separator 22 at the upper left and is connected by the tube 20 to the discharge passage 19 in the stator 10. It is not necessary that the oil separator 22 be connected directly to the air compressor as shown in Fig. 1; the separator 22 may, if desired, be remotely positioned with respect to said compressor 1.

The oil separator housing 60, Fig. 3, has a cylindrical counterbore 62 which extends centrally from the upper portion in a vertical direction. The wall of the counterbore 62 is provided with a recessed annular groove 63 which cooperates with dimpled protrusions 64 on a cylindrical baffle 65 which will be later described.

Immediately above and in axial alignment with the counterbore 62 is a narrow exit bore 66 which connects the larger counterbore 62 with a downwardly extending counterbore 67 which extends therefrom vertically through the top of the oil separator housing 60. In combination the counterbore 62, the exit bore 66 and the counterbore 67 provide an outlet passage through which compressed air may be expelled from the oil separator 22.

A discharge fitting 35 having a horizontal counterbore 68 that is threaded at its left end is provided to receive an air reservoir discharge line (not shown). Intersecting the counterbore 68 to the right is a crossbore 69 which passes through the discharge fitting 35 and slidably receives the check valve guide 34. The check valve guide 34 threadedly cooperates with the upper end of the counterbore 67 and has a vertical counterbore 70 which is blocked at its upper end by a stop plug 71. Below the stop plug 71 a suitable distance is a horizontal crossbore 72 which passes through the check valve guide 34 and intersects the crossbore 69 in the discharge fitting 35. Preferably this intersection should occur so that the horizontal crossbore 72 will be in axial alignment with the counterbore 68 in the discharge fitting 35.

The lower end of the counterbore 70 in the check valve guide 34 intersects a plurality of angularly arranged passages 73 and a valve stem receiving crossbore 74 which is in vertical axial alignment with the counterbore 70. The angularly arranged passages 73 connect the space enclosed by the counterbore 70 with the space enclosed by the counterbore 67. The valve stem receiving crossbore 74 slidably receives a cylindrical stem 75 of a check valve 76. Between the head of the check valve 76 and the lower end of the check valve guide 34 is a compression loaded spring 77 which biases a sealing cup 78 carried on the head of the check valve 76 into normal engagement with a cooperating valve seat 79.

Extending from the right of the counterbore 67 in the separator housing 60 is a passageway 80 which receives an air line 33 that connects the counterbore 67 with the inlet port 32 on the bellows housing 31. The purpose for this connection will be described later.

Opposite the passageway 80 in the separator housing 60 and to the left of the counterbore 67 is the counterbore 58 which enters the separator housing 60 but does not extend therethrough. The seat of the counterbore 58 intersects another counterbore 82 at right angles inside the wall of the separator housing 60 which intersecting counterbore 82 extends downwardly therefrom through the upper portion of the housing 60 and enters the housing 60 through the seat of the counterbore 62. The counterbore 58 receives one end of the air line 57 which has its opposite end connected to the unloader valve housing 54 in the control valve assembly 25 as described above.

The cylindrical baffle 65 was described as being held in position in the counterbore 62 of the oil separator housing 60 by means of the dimpled protrusions 64 formed on the baffle 65 which dimpled protrusions 64 cooperate with the annular groove 63. In its fixed position the baffle 65 extends downwardly from the counterbore 62 in the space defined by the tapered wall 61 of the oil separator 22. An annular dome-shaped baffle 83 having an aperture 84 of the same size as the outer periphery of the cylindrical baffle 65 is positioned on the baffle 65 so that its upper surface is engaged with the lower extremity of the counterbore 62. The dome-shaped baffle 83 is provided with an annular flange 85 which extends downwardly from the uppermost part of the dome 83 and which defines the aperture 84. The annular flange 85 is positioned in vertical alignment on the outer surface of the baffle 65 so the baffle 65 and flange 85 are engaged. A plurality of dimpled protrusions 86 on the cylindrical baffle 65 engage the lower edge of the annular flange 85 holding the domed baffle 83 in position and preventing movement between the baffles 65 and 83. The lower circular edges of the baffles 65 and 83 are approximately on the same horizontal plane.

The housing 60 of the oil separator 22 is, Fig. 1, mounted above the oil sump 2. The housing 60 is separated from the oil sump 2 by two suitable seals or gaskets 87 and 88 and a base plate 89 which is held in position between the seals 87 and 88. The base plate 89 is provided to interrupt the high velocity of the compressed air entering the oil separator 22 so it will not undesirably enter the oil sump 2 and come in contact with the oil therein. The upper region of the oil sump 2 has a downwardly and inwardly sloping surface 90 that permits the oil coming from the oil separator 22 to drain back into the sump 2.

A circular drain basin 91 is centrally positioned above the oil sump 2 and formed integrally with the base plate 89. The drain basin 91 is curved downwardly from an elevated edge 92 on the base plate 89. This elevation of the edge 92 of the drain basin 91 is achieved by having an annular rim 93 extending upwardly from the base plate 89 to said edge 92.

The drain basin 91 is provided with an aperture 94 at its center. Extending downwardly from said drain basin 91 in vertical alignment with the aperture 94 is a tubular elbow 95 which is fixedly connected to the lower side of the drain basin 91 by a suitable means such as a weld. The opposite end of the elbow 95 which is in a horizontal plane carries a flutter valve 96 which is held closed over the end of the elbow 95 by the force of gravity. The flutter valve 96 permits unidirectional flow of oil from the drain basin 91 through the elbow 95 and into the oil sump 2.

The vertical annular rim 93 which defines the periphery of the drain basin 91 also serves as a mounting means for an upwardly extending cylindrical baffle 97. The baffle 97 is placed onto the annular rim 93 so that the outer surface of the annular rim 93 is engaged with the lower inner surface of the baffle 97. The baffle 97 is aligned axially with the baffles 65 and 83; and the upper edge of the baffle 97 extends upwardly into the space defined between the downwardly extending edges of the baffles 65 and 83. For compressed air to travel between the inner surface 61 of the oil separator housing 60 and the exit bore 66 in the top of the oil separator housing 60, the air must move under the lower edge of baffle 83, and up and over the upper end of the baffle 97, down again and under the lower edge of baffle 65, and then vertically upward to the exit bore 66.

Formed integrally with the base plate 89 in the region between the annular rim 93 and the lower edge of the bell-shaped oil separator housing 60 are a plurality of air-scoops 98. The air-scoops 98 are shown in Fig. 3 punched upwardly from the base plate 89. The inner and outer transverse edges 99 and 100 of said air-scoops 98 are shown rounded to conform to the contour of the base plate 89 and the surfaces of said air-scoops 98 are deformed to define rounded surfaces. Fracturing the base plate 89 to form the air-scoops 98 provides drain holes 101 in base plate 89 through which oil may pass in the separating processes. The air-scoops 98 are directed to oppose counterclockwise movement of the compressed air which enters the oil separator from the inlet port 21 and to redirect the air upward.

*Operation*

During intervals when the compressor 1 is compressing air received from an external source, the discharge passage 19 in the stator 10 delivers the compressed air mixed with oil to the oil separator 22 through the air tube 20 which is connected between the discharge passage 19 on the stator 10 and the inlet port 21 in the oil separator 22. The inlet port 21 through which the compressed air enters the oil separator housing 60 is so positioned that the oil laden compressed air will move in a counterclockwise direction about the inner surface of the housing 60. The mixture will revolve about the inner surface of the separator housing and cause a centrifugal force to act. This centrifugal force has greater affect on the particles of oil carried by the compressed air than it does on the air itself because the oil particles are heavier. Consequently, the oil particles are thrown against the inner wall of the separator housing 61 where they cling and drain to the oil sump 2.

The air pressure is greater in the oil separator 22 than it is in the intake passage 17 of the compressor 1 during compression. Therefore a force develops from this pressure difference which acts on the oil in the oil sump 2 and urges the oil to return to the compressor 1. This is desirable because oil is needed in the compressor 1 to seal the parts that confine the air during compression making the compressor more efficient; and the returned oil also serves to lubricate the moving parts of the compressor. The flow of oil returning to the compressor 1 passes through the passage 2a, the bore 3, into the crossbores 5 and 6 and into the chamber 7 whence it leaves to lubricate and seal the rotor 8 and the stator 10 of the compressor 1.

When the pressure in the oil separator 22 is exhausted to the atmosphere, as will be shown later, the air control piston 41 will be in its rightward position. In this position the piston cup 43 will engage with its cooperating seat 44 and cut off the source of fresh air to the intake passage 17 of the compressor 1. When this occurs, the rotor 8 of the compressor 1 will continue to rotate attempting to compress more air. This attempt will create a partial vacuum in the intake passage 17 to the compressor 1. The oil separator 22 is at atmospheric pressure at this time and its pressure will be greater than the partial vacuum pressure in the compressor intake passage 17. Consequently, during non-compression there will still be a pressure difference between the oil separator 22 and the compressor intake passage 17 to urge the oil in the oil sump 2 into the compressor 1.

It is important to consider the operation of the air control valve 25, and the effect that it has on the operation of the compressor 1 and the oil separator 22. Two conditions will occur; one when the compressor 1 is supplying compressed air mixed with oil to the oil separator 22, and another when the input supply of fresh air to the compressor 1 is cut off thereby stopping the supply of compressed air. The latter condition will occur while the compressor 1 is idling. The operation of the compressor 1 shifts between the above two conditions in response to changes in the pressure in the air reservoir (not shown) which receives its supply of compressed air from the outlet passage in the top of the oil separator housing 60 as described.

If the pressure in the air reservoir reaches a predetermined maximum level, the air control valve 25 will be actuated preventing further fresh air from reaching the compressor 1. Conversely, if the pressure in the air reservoir diminishes to a predetermined lower pressure it will signal the air control valve 25 to commence supplying fresh air to the compressor.

With the air control valve 25 open, the compressor 1 supplies compressed air to the air reservoir through the oil separator 22. As the pressure in the air reservoir increases it will reach the predetermined maximum value. The pressure present in the air reservoir is also supplied by way of the air line 33 to the bellows housing 31. A pressure increase in the bellows housing 31 acts against the bellows 37 moving the bellows 37 and the bellows retainer block 38 to the right, Fig. 1. The retainer block 38 which is engaged with the left end 40 of the air control valve piston 41, urges the piston 41 rightwardly in opposition to the action of the compression loaded spring 48. When the air control valve piston 32 has moved to its rightward limit, the sealing cup 43 engages its cooperating seat 44, and shuts off the supply of fresh air to the intake passage 17 of the compressor 1. The compressor 1 is then unable to supply additional compressed air to the oil separator 22, and a partial vacuum is created in the compressor intake passage 17. This partial vacuum extends upwardly into the counterbore 46 that houses the spring 48, and to the unloader valve 102. The unloader valve 102 is drawn down by this partial vacuum and a free passage develops thereby from the atmosphere through passage 59, into the air line 57 and into the oil separator housing 60. In this manner the oil separator 22 has its pressure reduced to atmospheric pressure. The partial vacuum which operated the unloader valve 102 also acts on the sealing cup 43 of the air control piston 41 urging it into tighter cooperation with the seat 44. This vacuum force assists in preventing the return of the piston 41 to the left.

This condition continues until the pressure in the air reservoir diminishes to its predetermined lower limit. When this occurs there will be a similar reduction in pressure inside the bellows housing 31, and the force of the compression spring 48 will overcome the combined force of the reduced pressure on the bellows 37 and the partial vacuum which assists in seating the air control valve 41, urging the piston 41 to the left. With the piston to the left, fresh air is again supplied to the intake passage 17 of the compressor 1, and the compressor 1 resumes compressing air.

The opening of the air control valve 25 removes the partial vacuum on the unloader valve 102 which is then reseated by the spring 103 thereby removing the passage to atmosphere from the separator housing 60.

Turning in or out on the adjustable screw 49 in the right end of the air control valve assembly 25 changes the compression force of the spring 48 and varies the limits of pressure between which the air control valve 25 will operate.

When the sealing cup 43 is not engaged in its cooperating seat 44, air is able to enter at atmospheric pressure from the bore 30. This fresh air supply is drawn into the air control valve assembly 25 because of the partial vacuum developed in the intake passage 17 by the compressor 1. The partial vacuum in the intake passage 17 of the stator 10 creates a pressure difference which sucks air through the unidirectional valve 18 and into the compressor 1. The entering air is confined by succeeding vanes 15 of the rotor 8 on the lower right (Fig. 2), and the walls formed between cylindrical rotor member 8a and the stator 10.

As the rotor 8 turns clockwise the air between succeeding vanes 15 is confined into progressively smaller volumes. When the rotor 8 has turned to a position where these same two vanes 15 that started at the lower right are opposite the discharge passage 19 at the upper left of the stator 10, the compressed air moves into the discharge passage 19, the air tube 20, and through the inlet port 21 into the oil separator 22. Succeeding quantities of compressed air are delivered in this way in rapid order to the separator 22. Throughout the compression process the air is in contact with the oil that is sealing and lubricating the rotor 8 and the stator 10. A certain amount of this oil will be picked up and carried by the compressed air into the oil separator 22.

As described above, the mixture of compressed air and oil is introduced into the oil separator 22 with a swirling motion which causes the heavier particles to be thrown against the separator wall 61 where the particles cling and drain to the oil sump 2. Much of the oil is separated in this manner but because all of the oil is not thereby removed, the compressed air is also directed between the baffles 83, 97 and 65 on which additional oil settles due to the high speed directional changes of the compressed air.

The base plate 89 of the separator 22 is provided with the openings 101 which permit the separated oil to drain to the oil sump 2. The base plate 89 also prevents the high velocity incoming compressed air from undesirably coming in contact with the oil in the sump 2. This is accomplished in part by the base plate 89 itself and in part by having air-scoops 98 positioned to oppose the flow of the incoming air and redirect it upward. The air-scoops 98 also serve to remove a certain amount of oil from the compressed air by slowing down the air near the base plate 89. Therefore, during compression the combined action of the centrifugal force, the baffles 83, 97 and 65, the air-scoops 98 and the base plate 89 substantially separate the oil from the compressed air before the compressed air enters the air reservoir.

However, when the pressure in the oil separator 22 is reduced to atmospheric pressure during intervals when the compressor 1 is cut off from the fresh air supply, minute particles of compressed air which are carried by the oil in the oil separator 22 and in the oil sump 2 expand. This expansion due to the pressure change causes the oil to foam and rise from the sump 2 into the oil separator 22. The oil foam rises through the openings 101 in the base plate 89 formed where the air-scoops 98 are punched. The foam continues to rise between the outer surface of the lower baffle 97 and the inner surface of the oil separator housing 61. If the foam overflows the upper end of the baffle 97, it returns to the drain basin 91 where the oil drains out of the foam and passes into the elbow 95, through the unidirectional flutter valve 96, and back to the oil sump 2.

The danger of discharging part of this oil foam as usually results when the compressor 1 resumes compression, is eliminated because the oil foam is out of the discharge path of the compressed air when the compression resumes. The baffle 97 would have to completely fill with foam oil before there would be any undesirable discharge. Therefore, by increasing the capacity of the oil separator 22 to desirably handle this foam, the danger of discharging the oil foam to the air reservoir is eliminated. Consequently, the baffling and base plate arrangement maintains the oil separating characteristics required, and prevents the discharge of oil foam that develops when the compressor is idling. By the use of the present oil separator 22 an oil free compressed air source is maintained at all times.

Throughout this description the subject devices have been referred to with reference to the compression of air. Nothing should be inferred therefrom as limiting its use to air. Any gas may be compressed and separated as above described.

I claim:

1. An oil separator for separating oil from a mixture of compressed gas and oil comprising a separator housing secured to a base plate; passage means located near the top of the separator through which said mixture flows into the separator housing; deflector means in said housing for changing the direction of flow of the mixture therein, said deflector means including at least one air-scoop connected with the base plate, an upstanding baffle connected to the base plate, and depending baffle means connected to said housing and extending downwardly into overlapping spaced relationship with the upstanding baffle, said separator housing and said deflector means being positioned to intercept oil carried by the mixture; oil reservoir means positioned below the base plate for collecting the intercepted oil, unidirectional valve means on the base plate through which the intercepted oil passes to the oil reservoir from the separator housing; aperture means in the base plate located in communication with the housing and the reservoir through which oil passes between the separator housing and the oil reservoir means; and separator discharge means located at the top of the separator housing including a discharge passage with a unidirectional valve positioned therein for relieving the separator.

2. The oil separator set out in claim 1 wherein said upstanding baffle is positioned on said base plate between the unidirectional valve means and the aperture means.

3. An oil separator for separating oil from a compressed gas and oil mixture comprising a separator housing secured to a base plate; tangentially directed passage means adjacent to the periphery of the housing near the top thereof through which said mixture enters the housing; deflector means positioned in the housing to intercept oil carried by the mixture and for changing the direction of flow of the mixture therein, said deflector means including at least one air-scoop and at least one upstanding baffle connected with the base plate, and depending baffle means connected to said housing and extending downwardly in spaced overlapping relationship to said upstanding baffle; oil reservoir means connected to the base plate opposite the separator housing for collecting the intercepted oil; unidirectional valve means on the base plate through which the intercepted oil passes from the separator housing to the oil reservoir means, aperture means on the base plate through which oil passes between the separator housing and the oil reservoir; and separator discharge means including a passage extending upwardly through the housing, said passage having a unidirectional valve positioned therein.

4. The oil separator set out in claim 3 wherein the separator is provided with valve means in communication with the discharge means and responsive to predetermined pressure in the discharge means for relieving the separator to atmosphere, said valve means being transferable between a condition in which the separator housing is relieved to atmospheric pressure and a condition in which the separator housing is sealed off from atmospheric pressure in response to predetermined pressure changes in the discharge means, said valve means communicating with the discharge means through a passageway loacted near the top of the separator.

5. An oil separator comprising a housing having a base plate positioned thereunder; said housing having a top wall with at least one tubular baffle depending therefrom toward said base plate; said base plate having a tubular baffle extending upwardly therefrom in overlapping spaced relation with said depending baffle, at least one aperture in and at least one air-scoop connected to the base plate outwardly of said upstanding baffle, and a unidirectional check valve attached to the base plate inwardly of said upstanding baffle; an outlet through the top wall of said housing spaced above said check valve; and an inlet outwardly of said baffles.

6. An oil separator comprising a housing and a base plate, said housing having an upper wall with a plurality of spaced depending baffles extending downwardly therefrom in said housing, an upstanding baffle extending from said base plate into the space defined between said depending baffles, said base plate having at least one air-scoop and at least one aperture positioned outwardly of said upstanding baffle and a unidirectional check valve inwardly thereof, and said housing having outlet means located in the upper wall of the housing and inlet means outwardly of said baffles near the top of said housing.

7. The oil separator set out in claim 6 wherein said outlet means includes unidirectional valve means.

8. An oil separator comprising a separator housing having an upper wall, a side wall and a base plate, a plurality of spaced concentric depending baffles attached to the housing upper wall and extending therefrom in the housing part way to the base plate, an upstanding baffle attached to the base plate and extending from said base plate into the annular space defined between said depending baffles, said base plate having at least one air-scoop and one aperture therethrough positioned outwardly of said upstanding baffle and a unidirectional check valve positioned inwardly thereof, said housing having outlet valve means positioned in the upper wall thereof inwardly of the depending baffles and inlet passage means outwardly of said baffles.

9. An oil separator comprising a housing having a base plate connected thereunder, an inlet passage directed substantially tangential into said housing, an outlet passage through said housing opposite the base plate, said housing having a pair of spaced depending baffles extending downwardly from said outlet passage, an oil reservoir under said housing separated therefrom by said base plate, an annular oil basin formed in said base plate, an upstanding baffle circumscribing said oil basin and extending upwardly therefrom in overlapping spaced relation between said depending baffles, at least one air scoop and one aperture in said base plate positioned between said upstanding baffle and the housing, and unidirectional check valve means positioned in the annular oil basin for draining oil from the oil basin into the oil reservoir.

10. An oil separator for use with a gas compressor comprising a separator housing having an upper wall, an outer wall and an inlet passage along said outer wall; an oil reservoir positioned below the separator housing; a base plate positioned between the housing and the oil reservoir, said base plate having a central drainage basin with a unidirectional drain valve therein for accumulating and draining oil from the housing to the oil reservoir and an aperture outwardly of the drain basin communicating the separator housing with the oil reservoir; a baffle attached to the base plate and extending upwardly from the margins of the drain basin into the separator housing defining an oil drainage tank with said drain basin and a storage chamber outwardly thereof to the separator housing; and a depending baffle attached to the upper wall of the housing and extending downwardly therefrom in overlapping spaced relation to the upwardly extending baffle.

References Cited in the file of this patent

UNITED STATES PATENTS

| 1,691,536 | Winslow et al. | Nov. 13, 1928 |
| 2,016,641 | Lincoln | Oct. 8, 1935 |
| 2,113,447 | Hardinge | Apr. 5, 1938 |
| 2,200,198 | Beach | May 7, 1940 |
| 2,214,658 | Browning | Sept. 10, 1940 |
| 2,216,389 | Hawley | Oct. 1, 1940 |
| 2,288,245 | Kopp | June 30, 1942 |
| 2,392,872 | Wolfe | Jan. 15, 1946 |
| 2,669,321 | Schmidlin | Feb. 15, 1954 |
| 2,692,026 | Frantz | Oct. 19, 1954 |

FOREIGN PATENTS

| 224,601 | Switzerland | Mar. 1, 1943 |
| 506,149 | Germany | Aug. 29, 1930 |
| 621,638 | France | Feb. 12, 1927 |
| 700,791 | Great Britain | Dec. 9, 1953 |
| 849,950 | Germany | July 8, 1949 |